United States Patent
Moser

(10) Patent No.: US 7,032,443 B2
(45) Date of Patent: Apr. 25, 2006

(54) TIRE PRESSURE MONITORING SYSTEM AND METHOD OF USING SAME

(75) Inventor: George G. Moser, Brighton, MI (US)

(73) Assignee: Advanced Digital Components, Inc., Troy, MI (US)

( * ) Notice: Subject to any disclaimer, the term of this patent is extended or adjusted under 35 U.S.C. 154(b) by 0 days.

(21) Appl. No.: 10/528,383

(22) PCT Filed: Feb. 17, 2004

(86) PCT No.: PCT/US2004/004739

§ 371 (c)(1),
(2), (4) Date: Mar. 17, 2005

(87) PCT Pub. No.: WO2004/074013

PCT Pub. Date: Sep. 2, 2004

(65) Prior Publication Data

US 2006/0006994 A1    Jan. 12, 2006

Related U.S. Application Data

(60) Provisional application No. 60/494,066, filed on Aug. 8, 2003, provisional application No. 60/494,065, filed on Aug. 8, 2003, provisional application No. 60/470,612, filed on May 16, 2003, provisional application No. 60/448,085, filed on Feb. 15, 2003, provisional application No. 60/448,088, filed on Feb. 15, 2003.

(51) Int. Cl.
*B60C 23/02* (2006.01)
(52) U.S. Cl. ................................. 73/146.5
(58) Field of Classification Search ............ 73/146, 73/146.2, 146.3, 146.4, 146.5, 146.8, 722, 73/728; 340/58, 442–447
See application file for complete search history.

(56) References Cited

U.S. PATENT DOCUMENTS

| | | | |
|---|---|---|---|
| 1,683,343 A | 9/1928 | Gartner |
| 2,229,192 A | 1/1941 | Schultz |
| 2,629,086 A | 2/1953 | Ainsworth et al. |
| 3,521,230 A | 7/1970 | Poole |
| 3,588,814 A | 6/1971 | Furlong |
| 3,638,180 A | 1/1972 | Lejeune |
| 3,715,719 A | 2/1973 | Sugiyama |
| 3,777,565 A | 12/1973 | Munier et al. |
| 3,781,787 A | 12/1973 | Sugiyama |
| 3,828,309 A | 8/1974 | Yamasaki et al. |
| 3,872,268 A | 3/1975 | Hata |
| 3,925,755 A | 12/1975 | Hata |
| 4,006,402 A | 2/1977 | Mincuzzi |
| 4,119,944 A | 10/1978 | Smith |

(Continued)

FOREIGN PATENT DOCUMENTS

JP    361232906 A    10/1986

*Primary Examiner*—William Oen
(74) *Attorney, Agent, or Firm*—Cargill & Associates PLLC

(57) ABSTRACT

A tire pressure monitoring system (10) including a magnetic actuator (11) having an air pressure transducer therein for generating a signal proportional to the interior tire air pressure. The actuator (11) operates parallel to the axle to alleviate speed sensitivity. Magnetic actuator (11) communicates with a stationary field sensor (12) permanently mounted on the vehicle at a close proximity to the magnetic actuator (11). The magnetic actuator (11) rotates about the access with the wheel (15), and for every revolution of the wheel (15), comes in to close proximity to the sensor (12) at least once, and communicates information about the internal tire pressure to the driver.

17 Claims, 10 Drawing Sheets

U.S. PATENT DOCUMENTS

| | | | |
|---|---|---|---|
| 4,131,877 A | * | 12/1978 | Stewart et al. ............... 340/445 |
| 4,209,765 A | | 6/1980 | Mitchell |
| 4,311,984 A | | 1/1982 | Rigazio et al. |
| 4,339,955 A | | 7/1982 | Iwasaki |
| 4,570,152 A | | 2/1986 | Melton et al. |
| 4,627,292 A | | 12/1986 | Dekrone |
| 4,742,857 A | * | 5/1988 | Gandhi ....................... 152/418 |
| 4,843,886 A | | 7/1989 | Koppers et al. |
| 4,866,982 A | | 9/1989 | Gault |
| 4,953,394 A | | 9/1990 | Franke et al. |
| 5,469,136 A | | 11/1995 | Mastubara et al. |
| 5,526,861 A | | 6/1996 | Oshita et al. |
| 5,717,135 A | * | 2/1998 | Fiorletta et al. ........... 73/146.5 |
| 5,764,137 A | | 6/1998 | Zarkhin |
| 5,814,725 A | | 9/1998 | Furuichi et al. |
| 6,182,514 B1 | | 2/2001 | Hodges |
| 6,499,353 B1 | | 12/2002 | Douglas et al. |
| 6,520,006 B1 | | 2/2003 | Burns |
| 6,662,642 B1 | | 12/2003 | Breed et al. |
| 6,854,335 B1 | | 2/2005 | Burns |

* cited by examiner

TIRE PRESSURE MONITORING SYSTEM AND METHOD OF USING SAME

CROSS REFERENCES TO RELATED APPLICATIONS

This application claims the benefit of U.S. Provisional Application No. 60/448,085 filed on Feb. 15, 2003; U.S. Provisional Application No. 60/448,088 filed on Feb. 15, 2003; U.S. Provisional Application No. 60/470,612 filed on May 16, 2003; U.S. Provisional Application No. 60/494,065 filed on Aug. 8, 2003; and U.S. Provisional Application No. 60/494,066 filed on Aug. 8, 2003.

BACKGROUND OF THE INVENTION

1. Field of the Invention

The present invention relates to tire sensors for remotely monitoring tire pressure, methods of manufacturing same, and methods of using same. More particularly, the invention relates to a Hall effect tire sensor in mechanical, electromechanical and electronic versions.

Due to recent sport utility vehicle rollover deaths and accidents in the United States, there has been a great deal of attention focused on under-inflated tires and low tire pressure. As the center of gravity for SUV's is higher than for other vehicles, proper tire pressure is more critical. We need to prevent rollover accidents. As is common in the American culture, due to negligence tire pressure is allowed to get to low levels without maintaining the proper inflation for optimum safety in operating the vehicle. Low tire pressure can create many problems, including poor vehicle performance, increased wear of the tires, and elevated tire temperatures which will ultimately ruin the tire.

For tires being utilized on the popular sport utility vehicles where the center of gravity is particularly high when the vehicle is loaded with passengers and cargo, an under-inflated tire poses a special risk for rollovers. As one will recall, Ford Motor Company's car, the Ford Explorer, utilizing Bridgestone Tires, experienced an extraordinary number of rollovers and highway deaths as a result. According to statistics, in an attempt to correct that situation, the Ford Motor operator's manual, according to news stories, suggested that tires be over inflated in order to provide a safer ride. However, consumers, when confronted with the tire pressure monitor at a gas station-type coin operated air compressor, would fill the tire to the limits which are labeled on the side of the tire rim. It was proposed by plaintiffs' attorneys that a normal operator could not be expected to know the contents of the owner manual when the tire pressure was clearly labeled on the side of the tire.

Needless to say, in the above-mentioned criteria, a critical factor for safe operation of a vehicle is maintaining a proper air pressure within the tires. In reality, car operators ignore tire pressure until it becomes clearly apparent that the tire pressure is so low that the tire looks like it is going flat. On many occasions, this low tire pressure situation is allowed to continue, perhaps for months at a time.

Over the course of time, the tires remain in this potentially dangerous situation until the inflation has been restored to a proper level. Therefore, in accordance with their findings, the United States Congress passed the Transportation Recall Enhancement, Accountability, and Documentation Act (TREAD) in October of 2002. In the TREAD Act, there is a requirement that all new motor vehicles shall have a warning system to indicate to the operator when a tire is significantly under inflated. In order to provide a tire pressure monitoring system that complies with the TREAD Act, many companies have launched research projects to provide such a tire pressure system, that is highly reliable, does not experience confused signals, and one which will always indicate to the car operator when a dangerous situation exists. Generally, there is a warning light on the dashboard on the car to be connected, whether through wires or wireless transfer, to the tire pressure monitor system in the communication with the individual tires on the vehicle.

2. Description of the Prior Art

In the recent past, conventional RF transmitter tire pressure monitors and SAW device sensors have become well known in the art, including one of the most common types of tire sensors, a tire sensor that includes an RF transmitter for sending the signal.

However, practitioners of those inventions have become aware of certain problems which are presented by those prior art inventions. One particular problem that has plagued users has been that the RF transmitters become confused when two (2) cars get too close to one another. There are other complexities which give rise to a lack of reliability.

Various prior art configurations have been proposed to provide a tire pressure monitoring system which complies with the TREAD Act requirements. However, there have been problems inherent with each of those prior art methods and apparatuses, in that most of them included a radio communication device with a central radio receiver in the vehicle, which was powered by a battery. The present inventor has found that battery powered devices are prone to failure when the battery wears out, rendering the device unreliable, or at worst providing a lack of reliability on an intermittent basis which would be undetected by the operator. In addition, many of the devices which utilize a SAW device and/or piezoelectric pulsing, and the older type of reed switches, are speed sensitive and prone to unreliability because as the tire gets moving, pressures change, and problems are caused.

Although all of the prior art devices are technically feasible in principle, they also have several serious drawbacks. One of them is the sheer complexity of the device, which makes it susceptible to reliability issues. As the whole purpose of a tire pressure monitoring system is to increase safety, the system itself has to have a very high standard of reliability. And, as automotive engineers are aware, reliability is normally and inversely proportional to the complexity of the system.

Besides the complexity of the prior art systems, there are other issues relating to the reliability, which include the fact that most prior art systems need to be installed within the tire itself, in order to give a solid pressure reading. It would be a great advantage for a system that could be mounted on the valve stem, as the system could be interchanged with tires, as they were rotated around a vehicle, or changed, etc. This desired feature would dramatically increase the reliability of the tire pressure monitoring system, as is needed under the TREAD Act.

Yet one more problem experienced by the prior art that utilizes a radio signal, is the problem of confused signals when one car, and its radio frequency generating system, gets too close to another vehicle with a similar system. For instance, your car, as you are speeding down the highway, comes within several feet of another car in the lane next to you, and your receiver may pick up the signal which is given off by your neighbor's vehicle. A warning light would appear on your dashboard, and you would pull over to the nearest gas station in order to fill tires, which may be perfectly fine. Conversely, the vehicle which has a low tire pressure may pick up a signal from your vehicle, which indicates that their tires are perfectly fine, when in fact they may not be. One can imagine the confusion when there are hundreds of millions of transmitters and receivers (four transmitters and one receiver per every vehicle) which would all be on the highways, and potentially very close to one another. There would be millions of potential interference and misidentification situations arising. Again, due to the high level of complexity of this system, the cost is greatly inflated over simpler, more reliable systems.

And finally, the high cost and complexity of the presently available tire monitoring systems is so great that automobile manufacturers resist utilizing them, and are actively looking for alternatives that provided both a high level of reliability combined with cost effectiveness. Therefore, it would be most advantageous to provide a tire pressure monitoring system which simple, reliable, and inexpensive.

Further, it would also be a great advantage to make the system easier to install on a valve stem, rather than in the interior of the tire, whereby it will be easier to replace worn out tires and easier to rotate tires with a simpler system.

It would be of a great advantage to the automotive industry if there was provided a tire sensor monitoring system that does not rely on batteries or radio antennas, and method of making the same, and a method of using the tire sensor.

SUMMARY OF THE INVENTION

In accordance with the above-noted advantages and desires of the industry, the present invention provides numerous embodiments of a magnet-based tire pressure monitoring system, utilizing at least two magnets, i.e. a stationery sensor magnet attached to the frame of the vehicle, and a rotating magnet actuator which is mounted on the wheel, whether in the rim of the wheel or in the valve stem. The magnets may either be permanent magnets or electromagnets as described more fully hereinbelow. The magnets will preferably utilize the Hall effect in order to provide a signal which can be transmitted to the vehicle operator, i.e. a lighted panel on the dashboard of the vehicle. The rotating magnet mounted on the wheel acts as an actuator, while the permanent magnet mounted on the frame of the car acts as a sensor. The actuator is in contact with the air pressure inside the tire by somehow using a threaded hole in the rim or in the valve stem. That tire air pressure is in communication with a piston which is urged against a spring or an electronic pressure sensor, depending on the embodiment. The position of the piston is a function of the tire air pressure and is sensed by the Hall effect sensor mounted to the vehicle. The sensor is simply switched on when the pressure is higher when required and off when it is lower. As the wheel rotates, the sensor mounted on the non-rotating vehicle frame receives a signal from the actuator one time for every revolution of the wheel if the tire pressure is above a predetermined low-pressure set point.

After installation, there will be a small gap of from about 0.01 mm to about 50 mm between the actuator and the sensor which can be set by using a spacer bar or a feeler gage in the initial installation. An optional gap adjuster may also be included preferably on the sensor side. Once set, it does not need to be reset when rotating tires or installing the spare tire. In the first mechanical embodiment, the rotating magnet actuator that is attached to the wheel rim or valve stem includes a permanent magnet attached to a piston by an adhesive. A diaphragm is attached to the piston, and the combination of the diaphragm and piston makes the assembly very sensitive to minute changes in tire air pressure with a very low hysteresis, rendering the device very reliable.

The magnetic actuator will rotate with each revolution of the wheel and comes into close proximity to the sensor, including a silicon chip or semi-conductor permanently mounted in the auto-body frame, and will induce a voltage, the Hall voltage, thereby producing a voltage that can be used as a signal to indicate the presence or the absence of the magnet.

One specific preferred embodiment of the present invention utilizes a ferrous or rare earth magnet mounted on the rim of the vehicle to provide a pass/fail or on/off system to provide a dashboard indication. Another preferred embodiment has other features including the use of electromagnets, and/or electronic devices for measuring tire pressure.

The present invention is particularly useful for applications on tire rims and valve stems, and since nothing is installed inside the tire, the tire can be removed and replaced in a usual manner using standard equipment conventionally found in tire stores, and mechanic shops.

Although the invention will be described by way of examples hereinbelow for specific embodiments having certain features, it must also be realized that minor modifications that do not require undo experimentation on the part of the practitioner are covered within the scope and breadth of this invention. Additional advantages and other novel features of the present invention will be set forth in the description that follows and in particular will be apparent to those skilled in the art upon examination or may be learned within the practice of the invention. Therefore, the invention is capable of many other different embodiments and its details are capable of modifications of various aspects which will be obvious to those of ordinary skill in the art all without departing from the spirit of the present invention. Accordingly, the rest of the description will be regarded as illustrative rather than restrictive.

BRIEF DESCRIPTION OF THE DRAWINGS

For a further understanding of the nature and advantages of the expected scope and various embodiments of the present invention, reference shall be made to the following detailed description, and when taken in conjunction with the accompanying drawings, in which like parts are given the same reference numerals, and wherein.

DETAILED DESCRIPTION OF THE INVENTION

Figure 1:
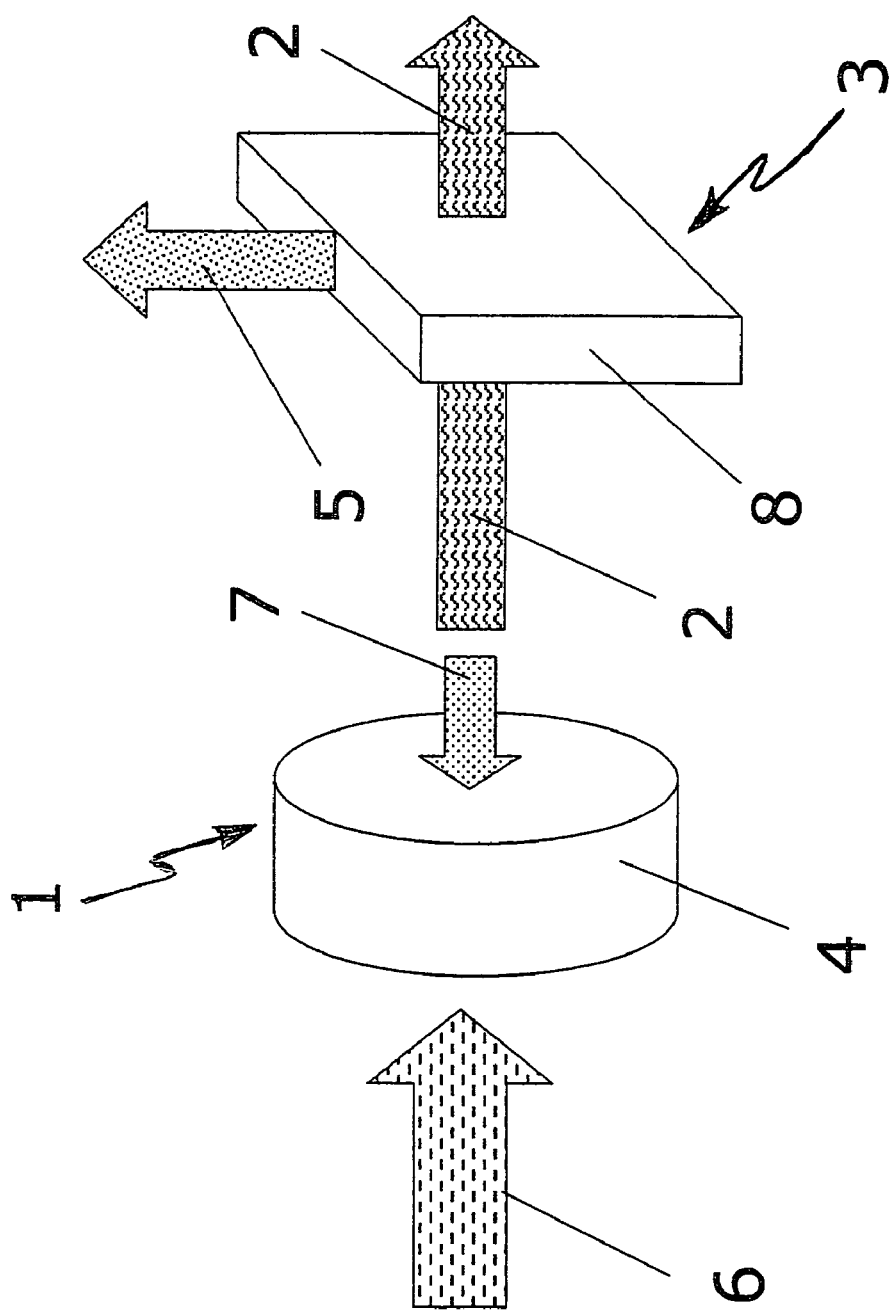
FIG. 1 is a schematic drawing of the concept of a Hall effect sensor useful in several of the embodiments of the present invention.

In accordance with the most preferred embodiment of the present invention, there is generally disclosed a Hall effect sensor as shown in concept form in FIG. 1 where the actuator 1 includes a magnet 4 having a magnetic field to induce a voltage 5 in a sensor 3. Sensor 3 preferably includes a semi-conductor, or silicon chip 8, generally, but may be any other type of magnetic sensor. Essentially, a tire pressure 6 is exerted against magnet 4 which is held in back by spring pressure 7. If the tire pressure 6 becomes too slight, spring pressure 7 will push magnet 4 away from Hall effect sensor 3, and the voltage 5 which is generated by magnetic field 2 will decrease to a point where it is noted that the tire pressure is to low for safe operation.

In the most basic form of the present invention, there are two components to this invention, an actuator and a sensor. The actuator is mounted on the wheel and it revolves around with the wheel. The sensor is stationary and is mounted permanently on a part of the vehicle that stays still, usually the axle assembly, since it is so close to the path of the actuator on the revolving tire. The actuator gives out a magnetic signal proportional to the tire pressure, and the sensor picks up that information, turns it into a useful signal, and communicates that information to the driver.

In a preferred embodiment, a tire pressure monitor and information communicator is disclosed for use in the operation of an automotive vehicle to relay information to the vehicle operator about the internal tire air pressure inflation level of each tire mounted on individual wheels on each axle of the vehicle. The tire pressure monitor includes at least one rotating magnetic actuator in communication with the internal tire air pressure of a tire on the vehicle. This magnetic actuator is preferably mounted through the wheel to provide access for the magnetic actuator to the internal tire air pressure. The mounting may be made through the wheel in a location selected from the group consisting of the wheel rim, the wheel valve, the wheel side, the wheel valve stem, and the tire itself.

An air pressure transducer is included within the at least one rotating magnetic actuator in a parallel relationship with the axle so that the transducer is speed-insensitive and reliable at any speed. The air pressure transducer generates a magnetic flux density proportional to the internal tire air pressure by transforming an input signal of said internal tire air pressure of from about 1.0 psi to about 100 psi to a detectable output signal for communicating tire pressure information to the vehicle operator.

At least one stationary field sensor is permanently mounted in a face-to-face relationship with the rotating magnetic actuator, where it rotates around at a physical distance gap between the rotating magnetic actuator and the field sensor of from about 0.01 mm to about 50 mm, preferably about 1 to 2 mm apart. The field sensor detects the signal generated by the rotating magnetic actuator each time it rotates past the field sensor as the wheel makes a revolution and converts that information into a signal emitted for communicating the information about the tire pressure. Whenever the tire pressure goes outside of a predetermined safe level for operating the vehicle, such as when the tire pressure goes below one (1) or more psi above the predetermined safe level, preferably two (2) psi. For example, if the tires need to be at least inflated to 32 psi for safe operation, and normal inflation is 36 psi, an alarm will be sent to the driver if the tire pressure drops below 34 psi.

This has been known in the past, to use Hall effect sensors for many automotive applications, however, it is unknown to the present inventor to utilize the Hall effect sensor as disclosed in combination with a tire pressure monitor in various embodiments, as will be described in more further detail hereinbelow. The following embodiments will be broken down by various categories including, but not limited to: I. Rim-mounted mechanical; II. Rim-mounted electronic pressure sensor; III. Valve-mounted mechanical and electronic; and IV. Valve-mounted electronic pressure sensor.

These embodiments will be disclosed in that order, but they all utilize the Hall effect sensor, or in the alternative, a commercially available proximity sensor, or field induction sensor. The following embodiments can utilize any of these sensors as long as they are facing one another, are non-speed sensitive and are generally in a proximity to one another that the sensing system can be utilized. The magnetic within the actuator utilizes at least one magnet selected from the group consisting of permanent ferromagnets, permanent rare earth supermagnets, electromagnets, rechargeably powered electromagnets, electromagnets powered by a capacitor, electronically controlled electromagnets, combinations of electromagnets for operations and recharging if needed and combinations thereof. Multiple magnets may be necessary if a recharging system is desired.

As is well known, when two magnets move past one another, a current is generated, and this current can be used to recharge a battery in the actuator, if it is used.

Preferably, though, this current would be generated to accumulate a charge in a capacitor which is favored now for automotive applications. Batteries are disfavored because they will eventually wear out, and reliability is the name of the game for this device. Embodiments may also include lasers, sound waves (sonar), radar, photoelectric cells, or any other know sensor rather than the Hall effect sensor. The at least one stationary field sensor is selected from the group consisting of a Hall effect sensor, a piezoelectric sensor, an electronic sensor, a proximity sensor, a field effect induction sensor, a strain gauge, a magnetically operated sensor, and combinations thereof. While this invention discloses those sensors, the scope of the invention will not be limited thereto.

I. Rim-Mounted Mechanical Embodiment

A rim-mounted mechanical embodiment is constructed in accordance with the present invention placing an actuator through the rim of the wheel, and includes a mechanical sensing device wherein a small piston is urged against the diaphragm in one direction by a spring, and in the reverse direction by the air pressure of the tire. The piston has a magnet adhered thereto. Generally, so long as the internal tire pressure from inside the tire pushes against the diaphragm at a certain level, the spring will hold the piston and the magnet in a predetermined spatial relationship from the Hall sensor itself to provide a signal, which can be communicated to the vehicle operator. Looking now to FIG. 2, the combination of the actuator and sensor is generally denoted by the numeral 10, including two basic components, i.e. an actuator 11 which is attached to the wheel and rotates around with every revolution of the tire, and a sensor 12 which is mounted on a non-rotating portion of the vehicle, in this instance the axle assembly 13.

The air pressure transducer of the magnetic actuator is a mechanically sensitive device preferably includes an elastic member retaining a piston adhered to a magnet. This elastic member may be a spring-piston combination attached to a diaphragm that is exposed to the tire air pressure. This elastic member may be selected from a group consisting of a helical spring, a compression spring, an expansion spring, a rubber plug, an elastomeric material, and an elastic bar of material having a suitable durameter strength to support the diaphragm. A foam rubber piece that is preselected for its compression strength would be the easiest way to provide a set resistance against the diaphragm urged out by the tire pressure.

Figure 2:
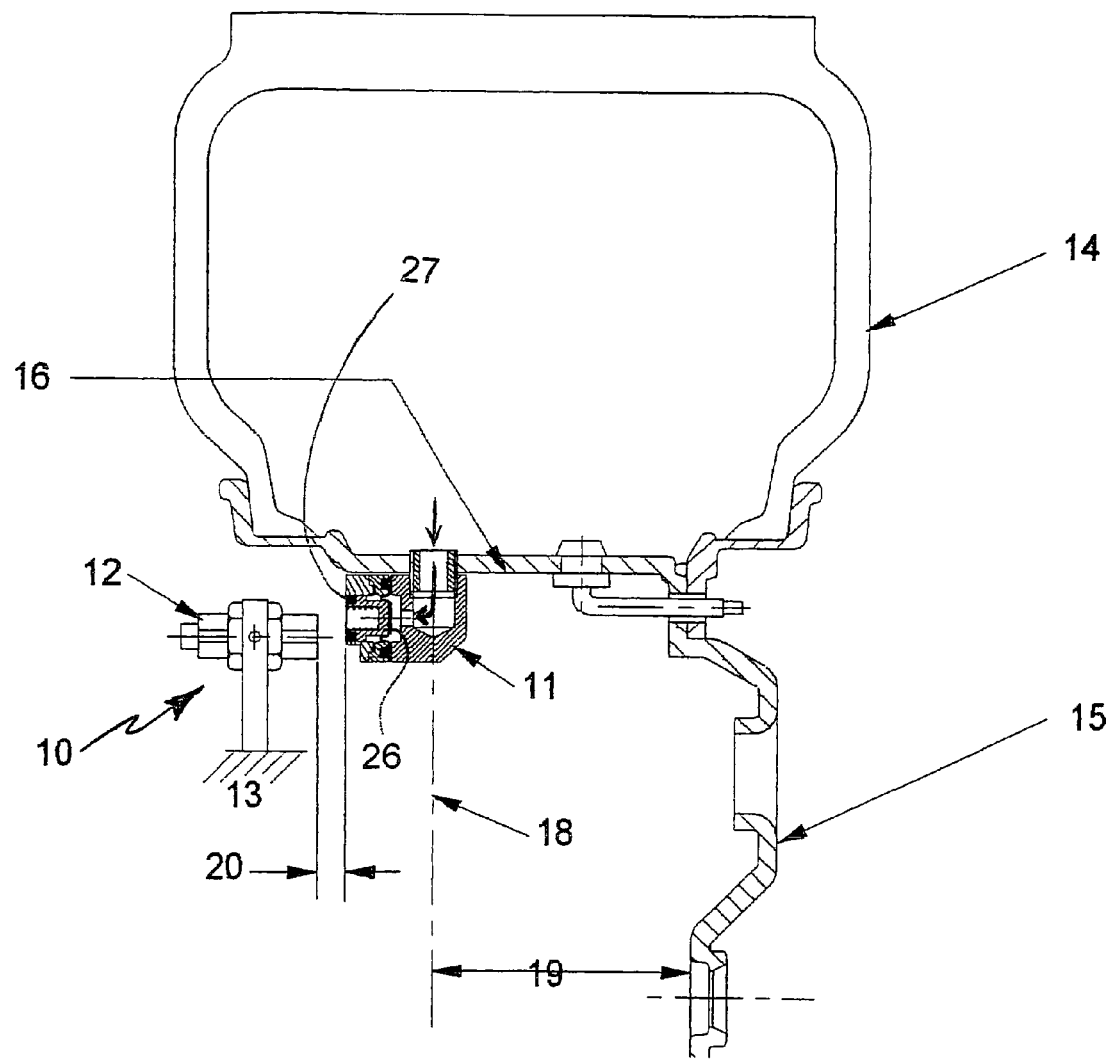
FIG. 2 is a cross-sectional side elevational view of a mechanical embodiment of the present invention in its environment within the wheel rim.
Figure 3:
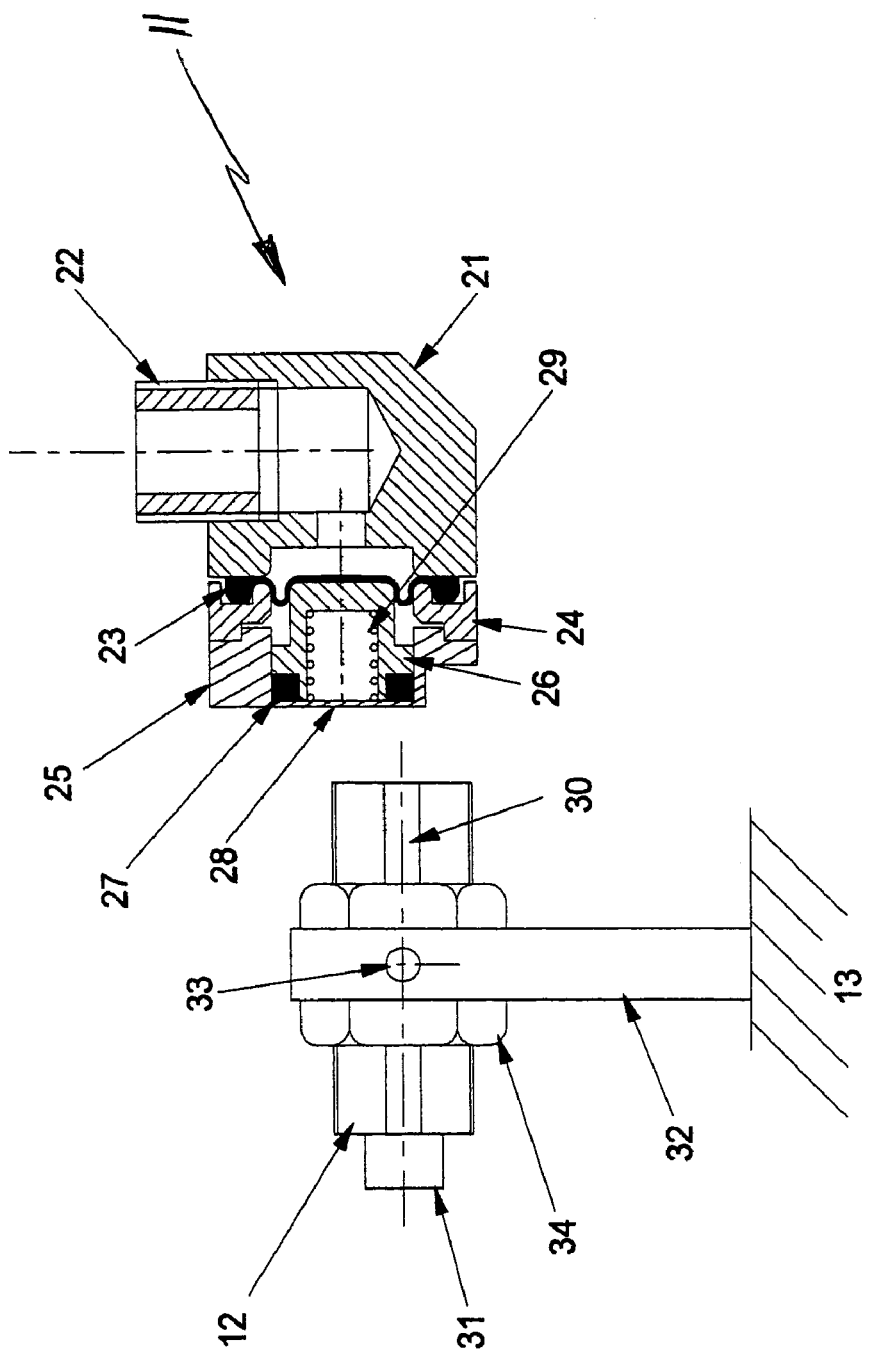
FIG. 3 is a partial cross-sectional side elevational view of the actuator and sensor constructed in accordance with the present invention, in a close-up view of the working parts of the invention.

Fundamentally, as actuator 11 rotates around with the wheel on an automotive vehicle, sensor 12 picks up the signal being sent regarding the tire pressure. In essence, if there is no signal from the actuator, sensor 12 picks up that fact and can relay a signal of low pressure to the dashboard of the vehicle. If, on the other hand, actuator 11 gives out a signal that the tire is at full pressure or at a pressure determined to be safe, then it relays that signal each time the tire goes around to sensor 12, and sensor 12 remains mute with regards to the indicator light on the dashboard. The magnet incorporated into the air pressure transducer of the magnetic actuator needs to only move from about 5 mm to about 15 mm, on the order of 12.7 mm away from the stationary sensor in order to cut off the signal, thereby triggering the transfer of that information to the vehicle operator. Actually, the commercial tolerances for the production of wheels is +/−0.010 inches for the gap distance. With this tolerance, the maximum difference in low-pressure set points when tires are rotated or the spare installed is +/−0.4 psi With that understanding in mind, we now make combined reference to FIGS. 2 and 3, in which FIG. 2 illustrates the relative placement of actuator 11 and sensor 12 in the context of an automotive vehicle with a wheel and tire attached thereto. FIG. 3 illustrates a close-up and cross-sectional view of the Hall effect actuator made in accordance with the present invention. In this first embodiment of the invention, all of the components are of a mechanical nature, although embodiments embracing electro mechanical and electronic embodiments will be described in more detail further hereinbelow.

Looking now to FIG. 2, there is generally shown the actuator 11 being threaded through the rim 16 of a vehicle wheel 15. Sealed thereon is tire 14. Wheel 15 is mounted onto the vehicle axis (not shown) on mounting face 17. Automotive vehicle commercials tolerances used in the manufacture of wheels is very tight, on the order of plus/minus 0.010 inches for distance 19, which is the distance between centerline 18 of the actuator 11 and the backside of mounting face 17. As this tolerance is tightly kept by manufacturers and is standard throughout the industry, the present invention may rely on that tolerance for the determination of gap 20 between sensor 12 and actuator 11. The piston travel of about 0.025 inch (0.635 mm) per 1 psi pressure change in the tire.

As is commonly used in a Hall effect sensor, gap 20 is kept at a predetermined value, in keeping with the commercial tolerance as the wheel, when the tire wheel 15 has been cleaned on the backside and is properly mated to the axle of the vehicle.

With combined reference now to FIGS. 2 and 3, it can be seen that a standard Hall effect sensor 12, commonly available from Micronas Semiconductor of Zurich, Switzerland, Lake Shore Cryotronics, Inc., of Westerville, Ohio, and Sypris Corporation of Orlando, Fla., is permanently mounted onto a non-rotating portion of the vehicle, for example axle assembly 13 in a predetermined distance apart of from about 0.01 mm to about 50 mm, preferably on the order of 1 mm to 10 mm and most preferably of from 1 mm to about 3

FIG. 3 is a close-up view of the tire pressure sensor 10 of the present invention, and includes the description of actuator 11, which is permanently mounted on the wheel, and the stationary field sensor 12 which is permanently mounted to the vehicle, such as an axle assembly 13. Actuator 11 is mounted through the wheel, as for example with the pipe nipple threads 22 extending through the wheel rim, and the internal air pressure from inside the tire is open in the cavity defined by housing 21. Diaphragm 23 is subjected to the air pressure from inside the tire and pushes against piston 26.

Adhered to piston 26 is magnet 27, and both are held in place by end housing 25. A retainer 24 holds end housing in place with its integral very thin end piece 28 to prevent road debris, grease and grime from contacting the magnet in the spring. Piece 28 is preferably from about 0.5 mm to about 5 mm thick.

Therefore, as one can see, the air pressure from inside the tire will push against the diaphragm which in turns pushes against piston 26, and consequently urges magnet 27 into position against the very thin end piece 28. If the air pressure from inside the tire gets too low, spring 29 will push piston 26 into the cavity created by the housing 21, whereby magnet 27 will be pushed away from very thin end piece 28, thereby reducing the magnetic field density which can be sensed by the field sensor 12. Field sensor 12 is permanently mounted to axle assembly 13, and is held in place by bracket or keyway 32 and held in rotational securement by pin 33. Jam nuts 34 hold sensor 12 in place, while connector 31 can be used to relay information, whether electrical or not, to the vehicle operator.

Although it is envisioned that initially a vehicle operator will have a dashboard indicator to indicate an unsafe road tire pressure situation, it is envisioned by the present inventor that any information relay method may be utilized, including an audio voice, which will tell a vehicle operator that the tire pressure is to low, or perhaps a vibration in the steering wheel, or any other signal which will get the attention of the vehicle operator. As new cars are incorporating holographic images in the windshield, it is also envisioned that such a piece of information could be sent to the vehicle operator in that manner, or it may be in a rear view mirror display. Regardless of how the information is communicated, connector 31 may directly connect to the ECU of the vehicle, or it may be a separate cable to communicate an electrical signal to the dashboard indicator, separate from the onboard computer. Although all these methods are envisioned by the present inventor, it is left to one of ordinary skill in the art to determine the best appropriate means for communicating information about the tire sensor to the vehicle operator.

Figure 4:
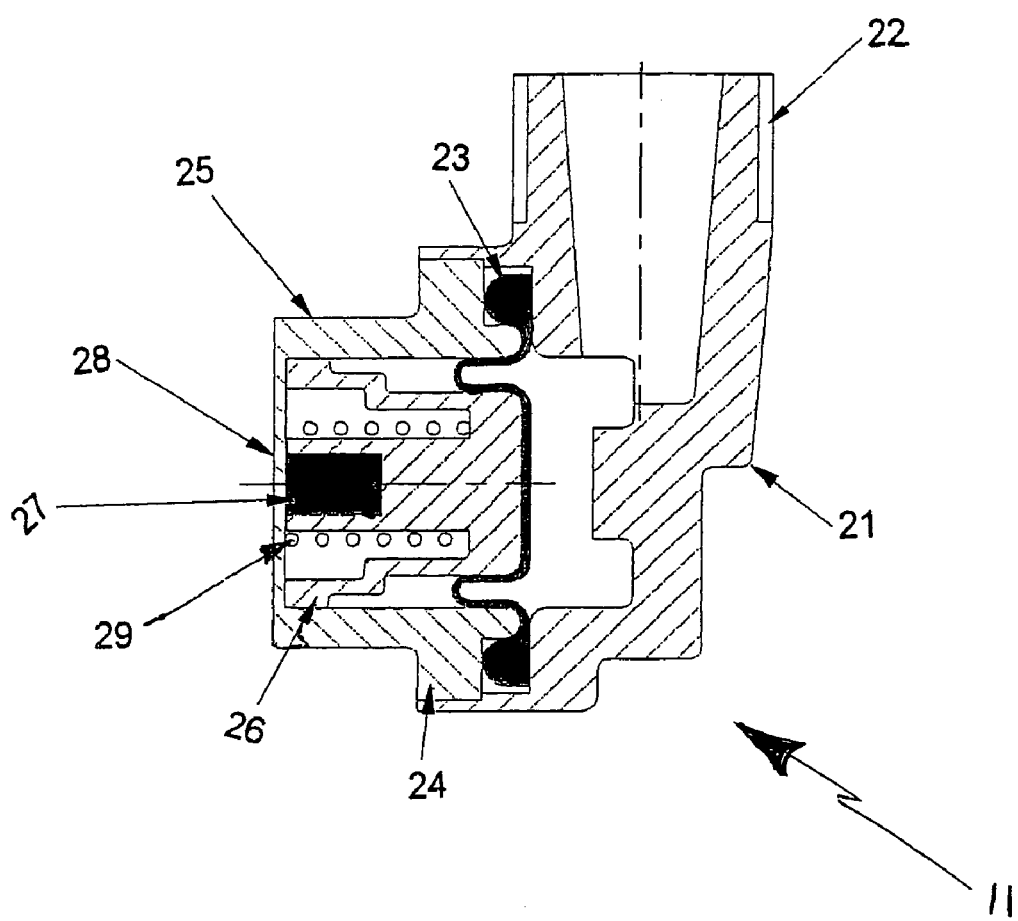
FIG. 4 is a cross-sectional view of another view embodiment including a sonic welded plastic construction of the present tire pressure monitor.

Looking next to FIG. 4, there is shown a slightly different embodiment of the invention of FIGS. 2 and 3, but include a sonic welded plastic construction with the inclusion of a cylinder magnet in between spring 29 mounted within a different configuration of piston 26. As disclosed hereinabove, a permanent magnet is suitable for this task, but any type of magnet may be utilized, when calibrated against the sensor and predetermining the appropriate gap distance between the actuator and the sensor. Again, as in FIG. 3, air pressure from interior of the tire comes down through the top of the actuator and enters into a chamber immediately adjacent to the diaphragm 23. In this embodiment, housing 25 is an integral piece, and does not consist of a separate retainer and end housing. FIG. 3 illustrates a toroidal magnet, where as FIG. 4 illustrates a bar or cylinder magnet.

II. Rim-Mounted Electronic Pressure Sensor

Figure 5:
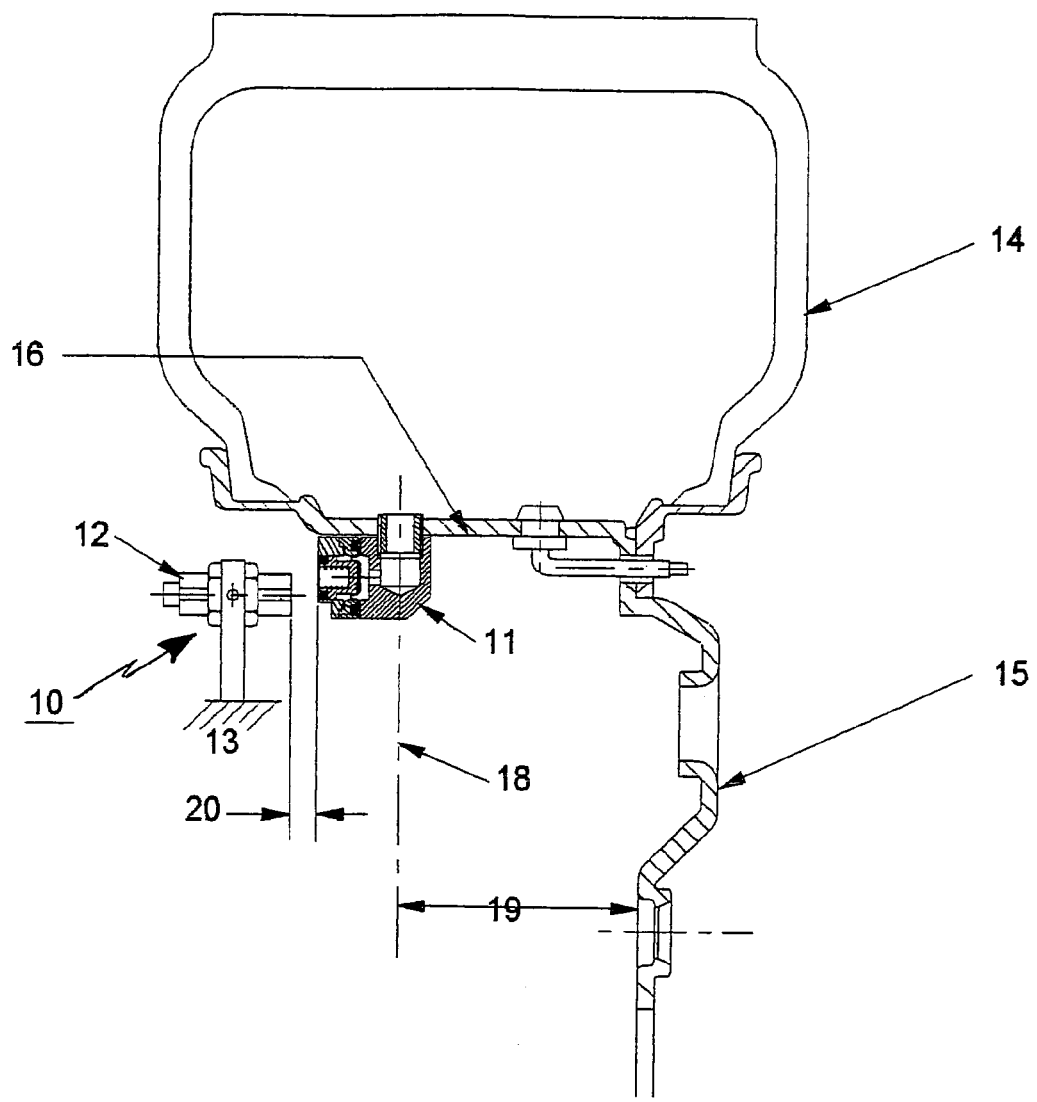
FIG. 5 is a cross-sectional side elevational view of the electronic embodiment of the present invention seen in its environment in the wheel rim.

In accordance with yet another embodiment of the present invention, FIG. 5 illustrates a rim-mounted electronic pressure sensor which maintains the similar principles of those illustrated in FIGS. 2 thru 4, with the exception that instead of a permanent magnet as shown in those figures, the present embodiment of FIG. 5 illustrates an electromagnetic coil 28 which may be powered by a power source 27, including batteries, rechargeable batteries, or a capacitor which is used to charge the electromagnetic coil 28. Again, FIG. 5 shows a communication between the actuator, generally denoted by numeral 11, in place and connected to the internal tire air pressure through wheel rim 16. Actuator 12 is once again mounted permanently to axle assembly 13 and has a physical distance gap 20 between actuator 11 and sensor 12. Again, centerline 18 of the actuator 11 is maintained at a distance 19 from the back mounting plate 17 of wheel 15. Tire 14 exerts pressure through wheel rim 16 and actuator 11 and forces the electromagnet to have particular values of the magnetic field by the amount of electricity which is put through electromagnetic coil 28.

Figure 6:
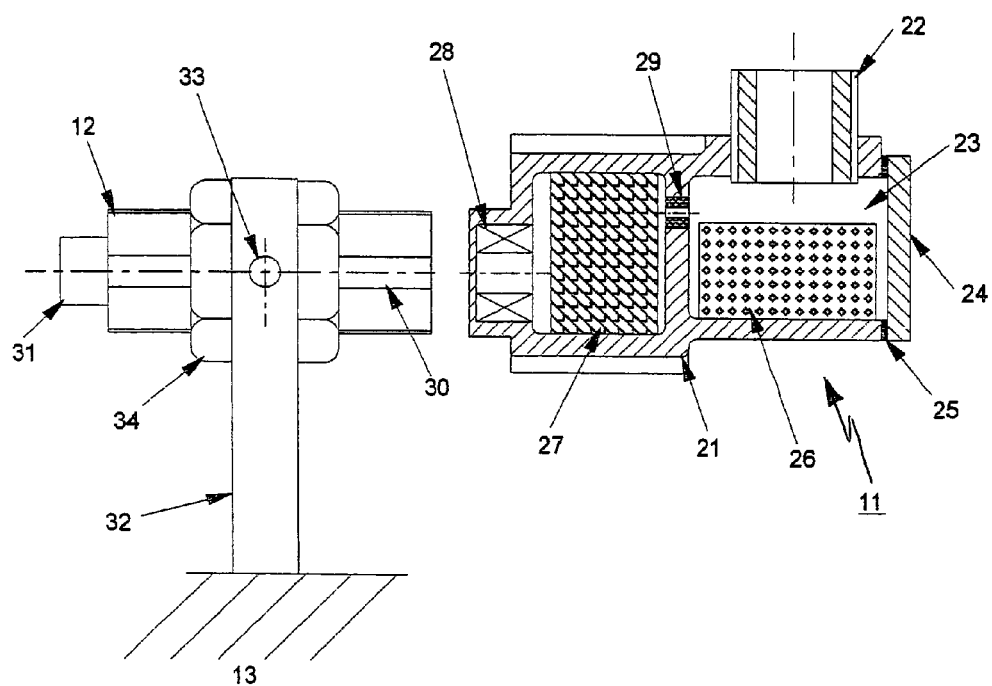
FIG. 6 is a close-up view of a partial side elevational cross-section of the electronic embodiment of the present invention.

With combined reference to close-up FIG. 6, it can be seen that an electronic board 26 acts as the pressure sensor, and may be a solid state pressure sensor, such as a piezoelectric transducer. Air pressure comes down through housing 21 attached to the wheel rim via pipe nipple 22. The air pressure comes into compartment 23 within housing 24 and applies pressure to the pressure sensor 26. In this embodiment, pressure sensor 26 is an electronic board, preferably piezoelectric or solid state, and may also include an amplifier to send a signal through wires 29 to the electrical power source 27 which in turn dictates the amount of electricity supplied to the electromagnetic coil 28.

In another embodiment of this invention, there may be at least one electromagnetic coil 28, where a first coil 28 is used to generate a magnetic field to be sensed by actuator 12 across gap 22, and the second coil may be used to recharge a battery if necessary or to provide power to a capacitor. It is well known that the electrical circuit attached to the actuator, when coming in contact with a rotating magnet 28 will generate electricity, to create a back voltage which will either recharge battery 27 or to accumulate charge in a capacitor 27. Similarly to the above-mentioned mechanical embodiment, actuator 12 is permanently attached to the vehicle, for example axle assembly 13 by keyway 32, which is held in place by pin 33. Jam nuts 34 hold the actuator in place, and may include an optional magnet 30, whether permanent or electromagnet, in order to induce the back voltage as described hereinabove. Again, electrical connector 31 is utilized to communicate information to the vehicle operator in any of the methods described above. It should be noted that any power supply which is economical, reliable and always ready to supply electricity to the electromagnetic coil 28 is suitable for use in this embodiment.

The actuator 11 is preferably made of injection molded plastic, but may also be milled from an aluminum block, or it may be rubber over-molded. The various components need to be isolated from the environment, in order to keep road debris, grime and dirt off of the working components. Any suitable covering is anticipated by the present inventor.

It may further be noted that in this embodiment, actuator 11 may be a "smart" actuator, or sensor 12 may be a "smart" sensor. An electronics engineer of ordinary skill in the art would be able to determine which is most economically and reliably feasible for this application. In other words, the actuator may be the "smart" end of the tire pressure monitor system herein, wherein a varying degree of information can be determined by the amount of the electromagneticity experienced by electromagnetic coil 28. On the other hand, sensor 12, utilizing its semi-conductor or silicon chip, may be the "smart" end of the present tire pressure monitor.

III. Valve-Mounted Mechanical and Electronic

Figure 7:
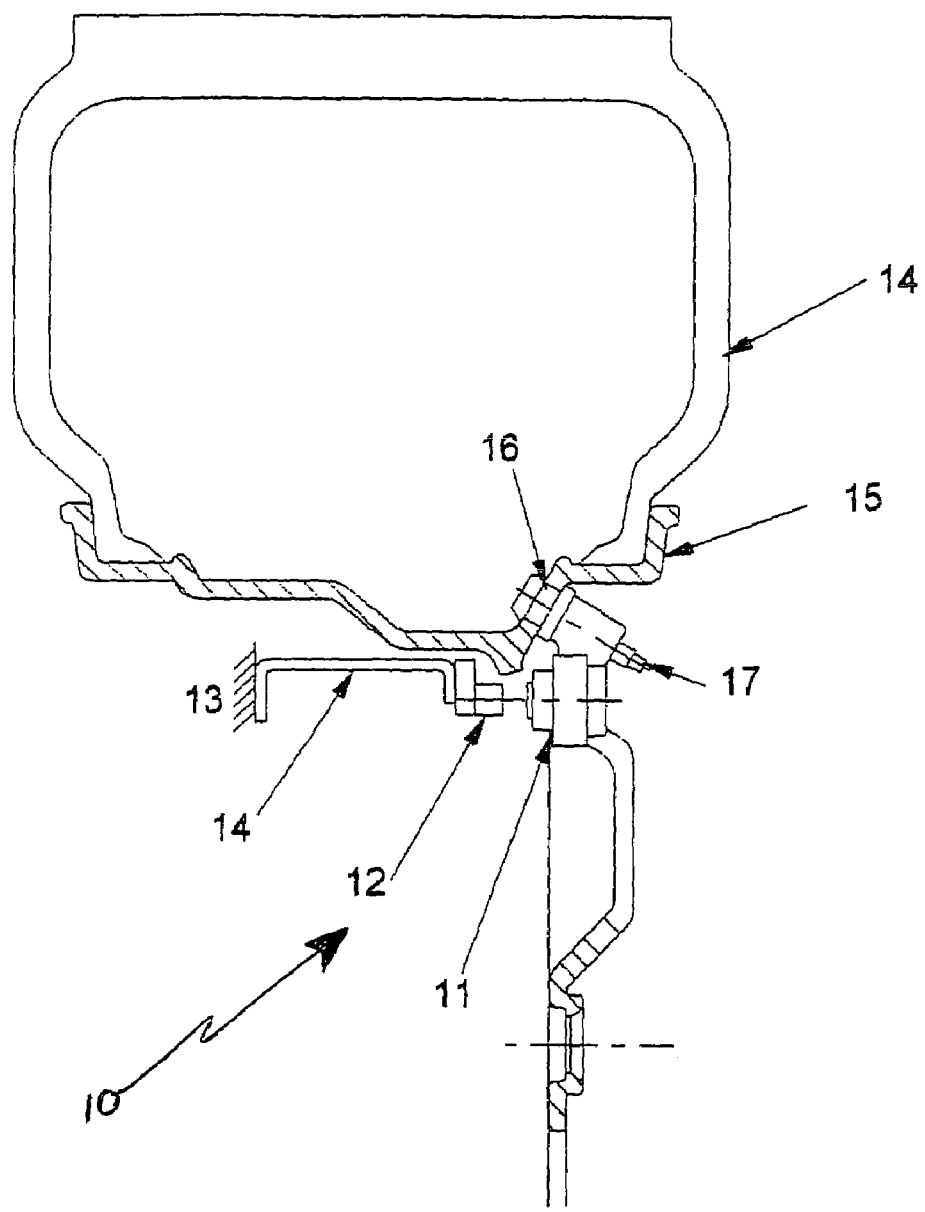
FIG. 7 is a side elevational cross-section of the valve-mount embodiment of the present invention located in the valve stem location through the wheel rim.

FIG. 7 illustrates the valve-mounted version of the present invention, in which the sensor is mounted and in communication with the tire pressure through the valve stem hole which is already present in any commercially available wheel. Actuator 11 is an integral piece with an extension of the valve stem used to refill air pressure into the tire. As the actuator is moved further outwardly from the center of the vehicle, sensor 12 needs to be extended from axle assembly 13 by a bracket 14, in order to allow for the gap between sensor 12 and actuator 11 to be an effective physical distance apart. Needless to say, a similar gap to those described hereinabove are needed in this embodiment as well.

Figure 8:
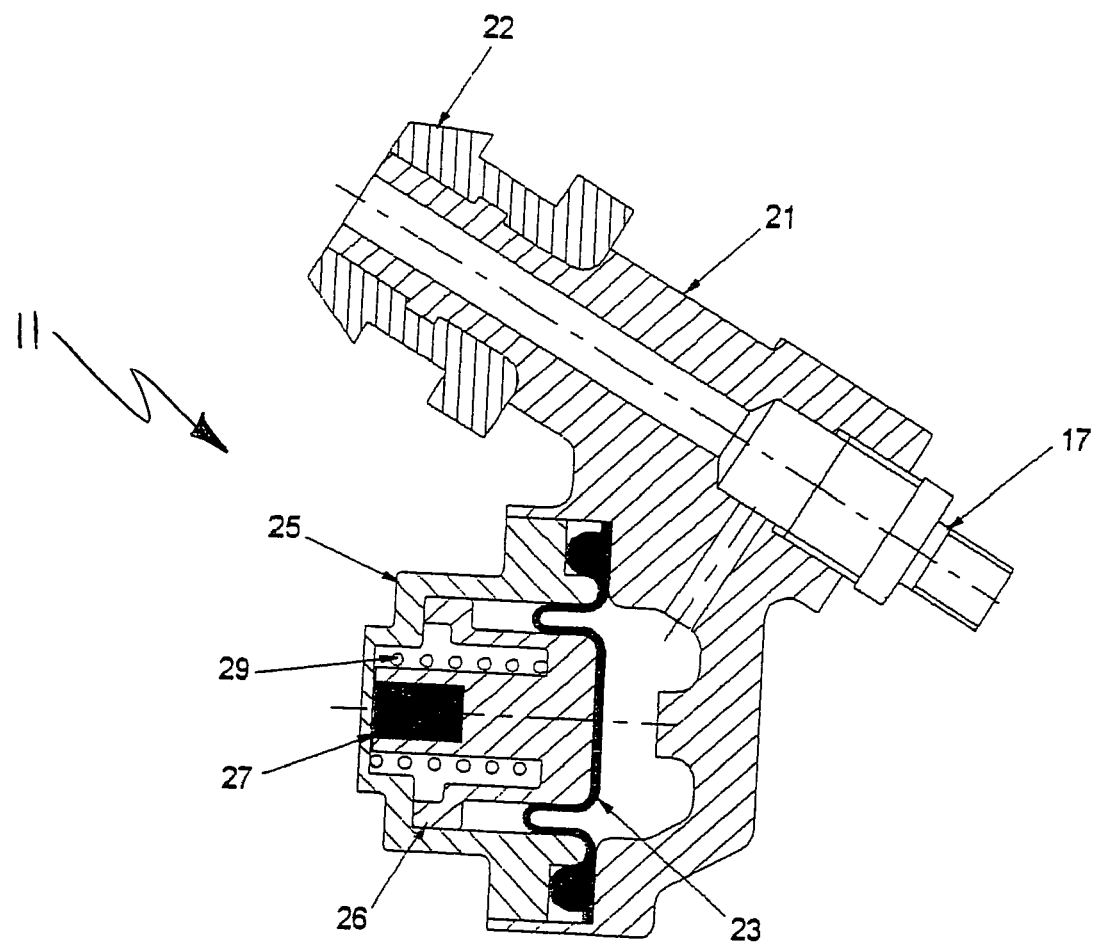
FIG. 8 is a cross-sectional view of the mechanical embodiment mounted in the valve stem.

Wheel 15 is shown having a tire 14 mounted thereon, with the valve stem hole 16 extending through wheel 15 so that valve stem 17 can still be accessed for refilling the tire pressure even when the actuator is mounted. Wheel 15 is a standard wheel, and the tire pressure monitor system of the present invention can be merely inserted through the valve stem opening 16 and continue to be operational by having valve stem 17 extending therefrom. Bracket 14 is the other additional piece which is required to extend sensor 12 to a proximity with actuator 11. Bracket 14 may be of any suitable configuration in order to put sensor 12 in a location which is a close proximity to actuator 11. Looking next to FIG. 8 there is shown a detail cross-sectional view of the valve mounted mechanical embodiment in which the valve actuator housing 21 includes a valve plug 22 at its distal end. Valve stem 17 is in direct communication with the air pressure received through housing 21, and further communicating with compartment 24 urging against diaphragm 23. The end housing 25 includes a very thin portion 28 which forms the surround for magnet 27 and spring 29 held within piston 26. This embodiment is very similar to those described hereinabove, but with the exception of the air compartment 24 being in communication with the internal tire air pressure of the tire through the valve stem opening.

IV. Valve-Mounted Electronic Pressure Sensor

Figure 9:
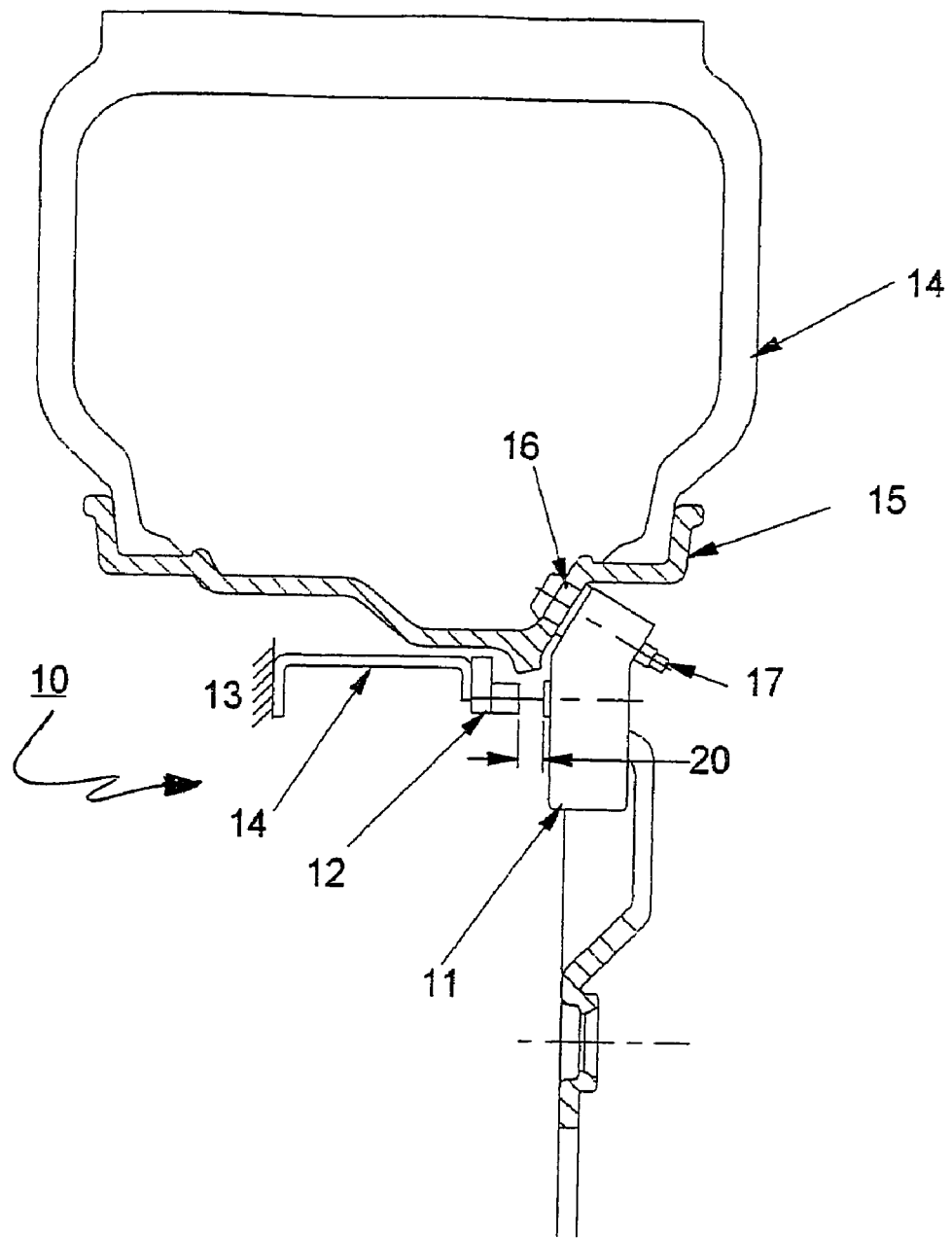
FIG. 9 is a side elevational view of an electronic pressure sensor embodiment valve mounted through the wheel in communication with the tire pressure.

FIG. 9 shows the relative placement of an electronic sensor through the valve stem opening of wheel 15 in the valve stem recess 16 after tire 14 is mounted thereon. Valve stem 17 is still available to the vehicle operator in order to refill the tires while maintaining a physical distance gap 20 between the actuator 11 and sensor 12. Sensor 12 is mounted onto bracket 14 which is permanently mounted to the axle assembly 13 on the vehicle.

Figure 10:
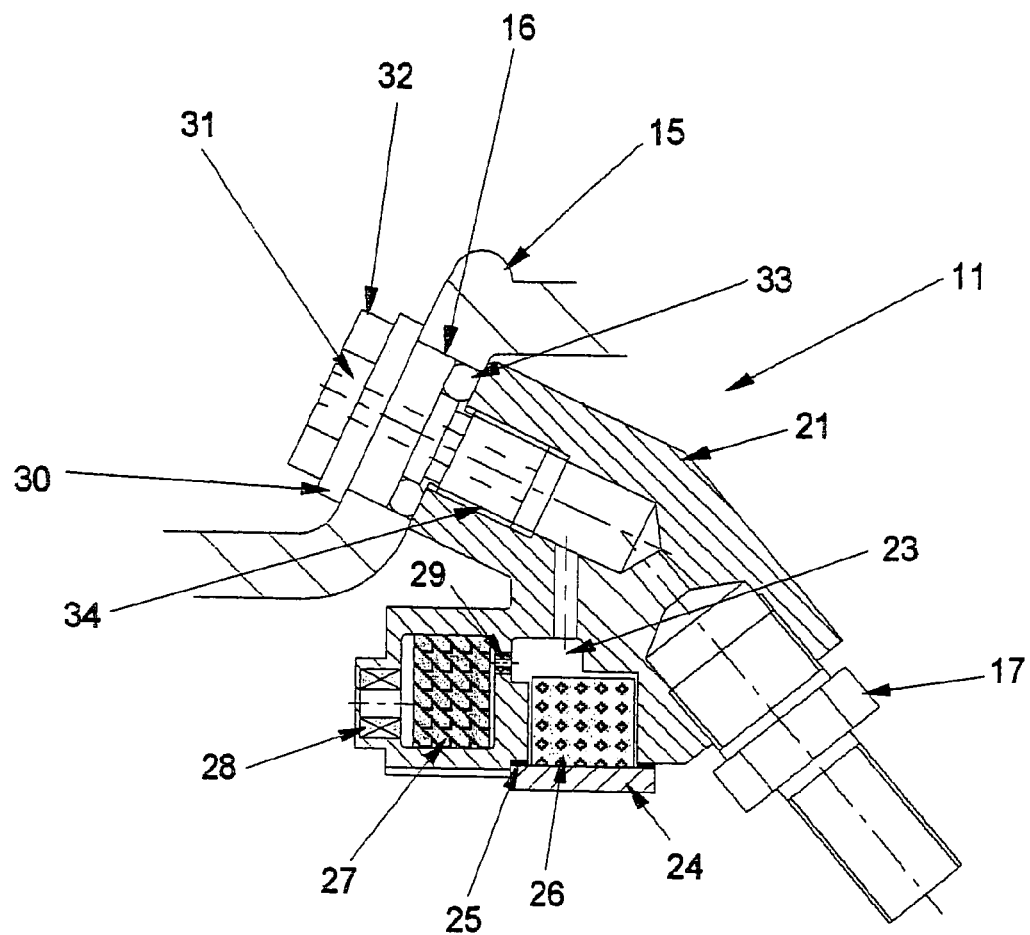
FIG. 10 is a cross-sectional view of the valve mounted electronic pressure actuator illustrating the relative placement through the wheel.

Looking next to FIG. 10, there is shown a cross-sectional view of the valve mounted electronic pressure sensor generally denoted by numeral 11. Again, the electronic version of actuator 11 includes power supply 27 in electrical communication with an electromagnetic coil 28 receiving information from electronic sensor 26 through the sealed wires 29. Housing 21 includes recesses for an air compartment 23 which is in communication with the internal tire pressure through recess 16 in wheel 15. Air compartment 31 is defined by the actuator housing 21 and through wheel bracket 30 held in place by jam nut 32. The outer elements are kept at bay, preferably by an O ring 33 which keeps the air pressure compartment 34 clean and free of road debris, dirt and grime. Valve stem 17 is still in open access to the vehicle operator from the outside of the wheel in order to refill the tire in the event that the tire pressure becomes to low.

The method of using the present invention may be summarized as follows: mounting at least one magnetic actuator through the wheel of the vehicle to communicate with the internal tire air pressure, so that the magnet of the at least one actuator faces the center of the vehicle, and so that the active part of the magnetic actuator is in a substantially parallel relationship to the axle of the wheel to minimize speed sensitivity. Also, permanently attach at least one stationary field sensor onto the vehicle, whereby the field sensor is in a face-to-face relationship with the at least one magnetic actuator, having a physical distance gap between the actuator and the sensor of between about 0.01 mm to about 50 mm, so that the field sensor can be located within the flux lines of the magnetic field of the magnetic actuator, whereby a signal may be generated. This leads to communicating a signal that is proportional to the internal tire air pressure to the vehicle operator regarding the safe operation of the vehicle.

To summarize, the above-described embodiments provide all the advantages and objectives desired by the automotive industry for detecting low tire pressure. The foregoing description of the preferred embodiments of the invention has been presented for purposes of illustration and description. It is not intended to be exhaustive or to limit the invention to the precise form disclosed. Obvious modifications or variations are possible in light of the above teachings with regards to the specific embodiments. These embodiments were chosen and described in order to best illustrate the principles of the invention and its practical applications to thereby enable one of ordinary skill in the art to best utilize the invention in various embodiments and with various modifications as are suited to the particular use contemplated. It is intended that the scope of the invention be defined by the claims which are appended hereto.

INDUSTRIAL APPLICABILITY

The present invention finds particular utility in the automotive industry, and finds a special utility for monitoring tire pressure changes, and inadequacies in order to operate a vehicle safely. The present invention includes a tire pressure monitoring system with an actuator and tire pressure sensor, and a transducer for relaying information to the vehicle operator such that when the tire pressure is either to low or to high, that information is relayed to the vehicle operator for appropriate action.

What is claimed is:

1. A tire pressure monitor and information communicator for use in the operation of an automotive vehicle to relay information to the vehicle operator about the internal tire air pressure inflation level of each tire mounted on individual wheels on each axle of the vehicle, comprising:

at least one rotating magnetic actuator in communication with the internal tire air pressure of a tire on the vehicle, said magnetic actuator being mounted through the wheel to provide access for the magnetic actuator to the internal tire air pressure, said mounting being made through the wheel in a location selected from the group consisting of the wheel rim, the wheel valve, the wheel side, the wheel valve stem, and the tire itself;

an air pressure transducer within the at least one rotating magnetic actuator mounted through the wheel in a parallel relationship with the axle so that the transducer is speed-insensitive and reliable at any speed, said air pressure transducer for generating a signal proportional to the internal tire air pressure by transforming an input signal of said internal tire air pressure of from about 1.0 psi to about 100 psi to a detectable output signal for communicating tire pressure information to the vehicle operator;

at least one stationary field sensor permanently mounted in a face-to-face relationship with the rotating magnetic actuator, said sensor being permanently mounted on a stationary portion of the vehicle, facing the rotating magnetic actuator as it rotates around at a physical distance gap between the rotating magnetic actuator and the field sensor of from about 0.01 mm to about 50 mm, whereby the field sensor detects the signal generated by the rotating magnetic actuator each time it rotates past the field sensor as the wheel makes a revolution; and a signal emitter for communicating information, said signal emitter being in communication with the stationary field sensor to communicate the signal information to the vehicle operator for relaying tire air pressure information whenever the tire pressure goes outside of a predetermined safe level for operating the vehicle.

2. The tire pressure monitor of claim 1, wherein the at least one rotating magnetic actuator utilizes at least one magnet selected from the group consisting of permanent ferromagnets, permanent rare earth supermagnets, electromagnets, rechargeably powered electromagnets, electromagnets powered by a capacitor, electronically controlled electromagnets, combinations of electromagnets for operations and recharging if needed and combinations thereof.

3. The tire pressure monitor of claim 1, wherein the air pressure transducer of the magnetic actuator is a mechanically sensitive device including an elastic member retaining a piston adhered to a magnet, and the spring-piston combination attached to a diaphragm that is exposed to the tire air pressure, wherein the elastic member is selected from a group consisting of a helical spring, a compression spring, an expansion spring, a rubber plug, an elastomeric material, and an elastic bar of material having a suitable durameter strength to support the diaphragm.

4. The tire pressure monitor of claim 1, wherein the air pressure transducer of the magnetic actuator is an electronic component including a power source, a pressure transducer and an electromagnet coil adapted for generating an output voltage proportional to the tire air pressure to which it is being subjected.

5. The tire pressure monitor of claim 1, wherein the magnetic actuator includes a magnet that generates a magnetic flux density of from about 1 mks to about 10 million mks with a magnet exhibiting from about 0.001 to about 50 tesla.

6. The tire pressure monitor of claim 1, wherein the at least one stationary field sensor is selected from the group consisting of a Hall effect sensor, a piezoelectric sensor, an electronic sensor, a proximity sensor, a field effect induction sensor, a strain gauge, a magnetically operated sensor, and combinations thereof.

7. The tire pressure monitor of claim 1, wherein the at least one stationary field sensor includes additional circuitry to produce a back voltage to recharge a battery in the rotating magnetic actuator.

8. The tire pressure monitor of claim 1, wherein the magnet incorporated into the air pressure transducer of the magnetic actuator needs to only move from about 5 mm to about 15 mm away from the stationary sensor in order to cut off the signal, thereby triggering the transfer of that information to the vehicle operator.

9. The tire pressure monitor of claim 1, wherein the stationary field sensor further comprises an amplifier in order to increase the signal being emitted.

10. The tire pressure monitor of claim 1, wherein the stationary field sensor includes a smart sensor that causes different information signals to be communicated to the vehicle operator by the signal emitter.

11. The tire pressure monitor of claim 1, wherein the signal emitter emits a signal every revolution of the wheel, said signal being proportional to the tire air pressure.

12. The tire pressure monitor of claim 1, wherein the signal emitter emits a danger signal when the tire pressure is less than from about 0.1 psi to about 5 psi above the lowest acceptable tire pressure for the vehicle.

13. The tire pressure monitor of claim 1, wherein the signal emitter emits a danger signal when the tire pressure is less than from about 1 psi to about 2 psi above the lowest acceptable tire pressure for the vehicle.

14. The tire pressure monitor of claim 1, wherein the signal emitter emits a signal by being hardwired into the onboard computer of the vehicle, and then the computer relays the information in any form and format that is predetermined for the application.

15. The tire pressure monitor of claim 2, wherein the signal emitter communicates to the vehicle operator by a method selected from the group consisting of a dashboard lighted display, a holographic windshield display, an electronic warning sound system, an LCD rear view mirror legend, and combinations thereof.

16. A tire pressure monitor and information communicator for use in the operation of an automotive vehicle to relay information to the vehicle operator about the internal tire air pressure inflation level of each tire mounted on individual wheels on each axle of the vehicle, comprising:

a rotating magnetic actuator in constant communication with the internal tire air pressure of a tire on the vehicle, said magnetic actuator being mounted through the wheel to provide access for the actuator to the internal tire air pressure, said mounting being made through the wheel in a location selected from the group consisting of the wheel rim, the wheel valve, the wheel side, and the wheel valve stem;

an air pressure transducer within the rotating magnetic actuator which generates a magnetic flux density proportional to the internal tire air pressure by converting an input signal of said internal tire air pressure of from about 1.0 psi to about 100 psi to an output signal of from about 1 mks to about 10 million mks of magnetic flux density;

a stationary magnetic field sensor permanently mounted on the vehicle at a physical gap of from about 0.01 mm to about 50 mm from the rotating magnetic actuator as the wheel to which it is attached revolves around the axle of the vehicle during operation, whereby the magnetic field sensor detects the magnetic flux density generated by the rotating magnetic actuator each time it makes a revolution with the wheel; and a signal emitter in electrical communication with the stationary magnetic field sensor that emits a signal to communicate information to the vehicle operator for relaying low tire air pressure information once the tire pressure drops to a level of less than from about 1 to about 5 psi more than a safe tire air pressure for operating the vehicle.

17. A method of using the tire pressure monitor of claim 1, comprising the steps of:

mounting at least one magnetic actuator through the wheel of the vehicle to communicate with the internal tire air pressure, so that the magnet of the at least one actuator faces the center of the vehicle, and so that the active part of the magnetic actuator is in a substantially parallel relationship to the axle of the wheel to minimize speed sensitivity;

permanently attaching at least one stationary field sensor onto the vehicle, whereby the field sensor is in a face-to-face relationship with the at least one magnetic actuator, having a physical distance gap between the actuator and the sensor of between about 0.01 mm to about 50 mm, so that the field sensor can be located within the flux lines of the magnetic field of the magnetic actuator, whereby a signal may be generated; and communicating a signal that is proportional to the internal tire air pressure to the vehicle operator regarding the safe operation of the vehicle.

* * * * *